United States Patent
Beauviala

[11] Patent Number: 5,871,167
[45] Date of Patent: Feb. 16, 1999

[54] CINEMATOGRAPHIC FILM CASSETTE

[75] Inventor: Jean-Pierre Beauviala, Grenoble, France

[73] Assignee: Aaton, Grenoble, France

[21] Appl. No.: 793,393

[22] PCT Filed: Jun. 28, 1996

[86] PCT No.: PCT/FR96/01007

§ 371 Date: Apr. 28, 1997

§ 102(e) Date: Apr. 28, 1997

[87] PCT Pub. No.: WO97/01794

PCT Pub. Date: Jan. 16, 1997

[30] Foreign Application Priority Data

Jun. 29, 1995 [FR] France ................................. 95 08071

[51] Int. Cl.$^6$ ................................................. G11B 23/093
[52] U.S. Cl. ........................................ 242/345.1; 352/156
[58] Field of Search ................................. 242/342, 345.1, 242/356.1; 352/156

[56] References Cited

U.S. PATENT DOCUMENTS

| 3,475,089 | 10/1969 | Funck | 352/156 |
| 3,539,130 | 11/1970 | Winkler et al. | 242/345.1 |
| 3,829,203 | 8/1974 | Novak | 352/156 |
| 3,888,431 | 6/1975 | Laine | 242/345.1 |
| 3,921,935 | 11/1975 | Springsits | 242/345.1 |
| 3,955,778 | 5/1976 | Lu | 242/345.1 |
| 4,131,925 | 12/1978 | Firth et al. | 242/345.1 |
| 4,190,216 | 2/1980 | Kluczynski et al. | 352/156 |
| 5,433,397 | 7/1995 | Lalouette et al. | 242/342 |
| 5,628,468 | 5/1997 | Jung et al. | 242/345.1 |

FOREIGN PATENT DOCUMENTS

| 2 125 178 | 2/1984 | United Kingdom | 242/345.1 |

Primary Examiner—John P. Darling
Attorney, Agent, or Firm—Plevy & Associates

[57] ABSTRACT

A movie film cassette comprises a light-tight casing containing an unexposed film reel and adapted to contain, after shooting, an exposed film reel. The reels and the film are positioned so that, in an operating position within a reception device associated with a movie camera, no moving element, located in the casing and contacting the film, is in contact with a fixed element of the casing.

20 Claims, 5 Drawing Sheets

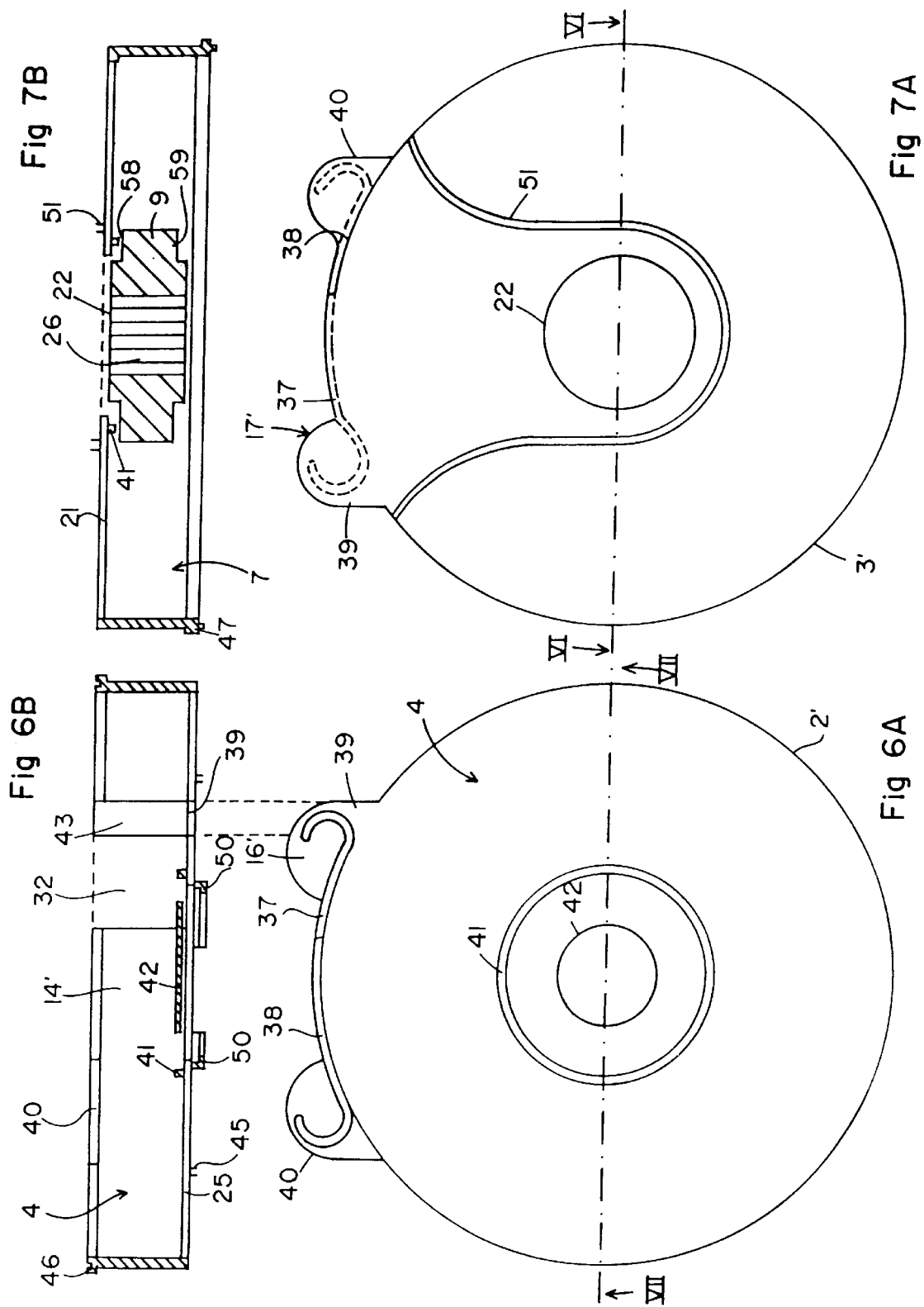

CINEMATOGRAPHIC FILM CASSETTE

The present invention relates to movie film cassettes, and more particularly to an expendable cassette designed to receive an unexposed film reel and to store the exposed film until development. The invention more particularly relates to movie films, for example, 16-mm or 35-mm films.

Such films are conventionally included in a magazine associated with a movie camera. The unexposed film is unrolled in front of a shutter from a supply reel engaged about a shaft of a supply compartment through a driving mechanism. The exposed film is wound on a collection reel engaged about a motor driven shaft of a collection compartment of the magazine. Because of the important length of film that is generally used in this type of movie camera, the supply and collection reels are generally wound coaxially about cores which cooperate with coaxial supply and collection shafts, respectively, linked to the magazine.

A drawback of conventional magazines is that the loading of an unexposed film in the magazine and the collecting of an exposed film require absolute darkness, because an unexposed reel is loaded down flat by engaging a first core, around which the film was rolled during fabrication, on the supply shaft of the magazine. The film leader is then engaged in the driving device of the magazine and fixed to a second empty core engaged on the collection shaft of the magazine. Even though the magazine can be closed as soon as the unexposed film is placed about the supply shaft and the film leader is engaged into a slot provided for this purpose, since the supply compartment is isolated from the rest of the magazine, inserting an unprotected reel into the supply compartment may veil the unexposed film. An exposed film is taken out by opening the collection compartment and extracting the core about which the exposed film reel is wound. The exposed film is taken out in a flat position, as for loading, and is not protected from light.

In order to permit to load or to take out the magazine without exposure to day-light, the optic block of the camera, which includes means for engaging the driving mechanism, is generally separated from the magazine including the driving mechanism. Indeed, 35-mm films, and even 16-mm films, are frequently used to shoot feature-length films which require the use of several film reels. Such films are not necessarily shot in studios and are often far away from a dark room where the loading or unloading of the magazine can be safely achieved. Thus, this operation generally requires the use of several magazines which are preloaded to shoot under acceptable safe conditions for the film reels. However, the driving mechanism of the magazine is a very expensive system because it should be noiseless and be very accurately fabricated. Hence, the need for providing a plurality of magazines is expensive.

In the prior art, movie film cassettes including two coaxial supply and collection reels, respectively, have been devised. U.S. Pat. No. 3,829,203 and U.S. Pat. No. 3,475,089 describe such a cassette. This cassette includes, in addition to the two reels, a back pressure pad for urging a portion of the film which passes in front of an aperture of the cassette and which is designed to face a shutter of an optic block of a camera.

A drawback of such a conventional cassette is that it should contain all the guide pins and rollers for bringing the film from the reels up to the back pressure pad. In particular, since the back pressure pad is included in the cassette, the cassette must have means for driving the film from one reel to the other although they are coaxial. This complicates the fabrication and increases the cost. In addition, the constitution of the cassette needs the film to be in contact with fixed or rotating elements, coupled to the walls of the cassette, which constitutes a source of noise because of the fabrication tolerances relative to a low cost expendable cassette.

A further drawback of such a cassette is that it does not ensure accurate positioning of the film in front of the shutter of the optic block. Indeed, since the back pressure pad is included in the cassette, the positioning of the film depends upon the fabrication tolerances of the cassette.

Document U.S. Pat. No. 3,475,089 describes an embodiment in which the back pressure pad and the guiding rollers of the film from the cassette to the back pressure pad are mounted to the camera. If this embodiment improves the positioning of the film in front of the shutter, the film is still forced to rub against elements which are statically or rotably mounted to walls of the cassette for guiding the film between the reels and slots for communication with the outside of the cassette.

An object of the present invention is to avoid accidental exposure of an unexposed or exposed film during loading or unloading in a reception device including a driving mechanism designed to be associated with a camera optic block, while preventing noise from being generated during winding of the film.

A further object of the present invention is to provide an expendable cassette, all the elements of which can be fabricated with a much greater tolerance than the small tolerance required by the driving mechanism.

A further object of the present invention is to provide optimum positioning of the film with respect to the optic block of the camera.

To achieve these objects, the present invention provides a movie film cassette comprising a light-tight casing containing an unexposed film reel and adapted to contain, after shooting, an exposed film reel, means for positioning said reels and the film so that, in an operating position within a reception device associated with a movie camera, no moving element, located in the casing and contacting the film, is in contact with a fixed element of the casing, the film, itself, not being in contact with a fixed element of the casing.

According to an embodiment of the invention, said means for positioning said reels include means for cooperating with a main shaft of the reception device adapted to penetrate into said casing through a main aperture, for axially positioning and maintaining, about the main shaft, coaxial cores about which the reels are rolled.

According to an embodiment of the invention, said maintaining means are formed by a disk accommodated, with a determined clearance, in an inner surface of a wall of the casing opposite to a wall in which the main aperture is formed, the disk being adapted to cooperate through magnetization with a free end of the main shaft.

According to an embodiment of the invention, the casing includes means for limiting, with a determined clearance and when the cassette is in a storage position outside the reception device, the axial and radial displacements of the cores.

According to an embodiment of the invention, the means for limiting the displacements of the cores with clearance are formed, for axial displacements, by the thickness of the main compartments defined by the casing for the reels.

According to an embodiment of the invention, the cores are longer than the width of the film for which they are designed and include, near each of their ends, a shoulder forming means for limiting, with a determined clearance, the axial and radial displacements of the cores.

According to an embodiment of the invention, the cassette comprises two shutters adapted to close openings for the passage of the film when the cassette is in a use position.

According to an embodiment of the invention, the casing defines two secondary recesses for receiving one end of the shutters in the closed position for defining, with holes of the secondary recesses, narrow slots for communication between the inside and the outside of the cassette.

According to an embodiment of the invention, the shutters constitute, in the closed position, guiding means for the film between said reels and the slots.

According to an embodiment of the invention, the openings are sized such that, when the shutters are open, the film is not in contact with a wall of the casing, whichever the diameter of the reels.

According to an embodiment of the invention, said means for positioning said film include a hollow roller associated with each reel, each roller being designed to guide the film from the reel associated therewith toward a slot communicating with the outside of the casing and adapted to be engaged, with radial clearance, in a secondary shaft provided in said reception device.

According to an embodiment of the invention, the casing is formed by a first shell constituting a first main compartment for said unexposed film reel, a second shell constituting a second main compartment for said exposed film reel, each of said slots being formed in one of the shells along a longitudinal direction parallel to the axial direction of the reels.

According to an embodiment of the invention, the cassette includes light-tight means adapted to cooperate with corresponding means included in the reception device to protect from light at least one portion of the film external to the casing.

The foregoing and other objects, features, aspects and advantages of the invention will become apparent from the following detailed description of the present invention when taken in conjunction with the accompanying drawings, among which:

FIG. 6A is an internal elevation view of a first shell forming a cassette such as shown in FIG. 4;

FIG. 6B is a cross-section view along line VI—VI of FIG. 6A;

FIG. 7A is an external elevation view of a second shell forming a cassette such as shown in FIG. 4; and FIG. 7B is a cross-section view along line VII—VII of FIG. 7A.

For sake of clarity, the figures are not drawn to scale and the same elements are designated with the same reference characters in the various drawings, and only those elements which are necessary to the understanding of the invention are shown in the figures.

Figure 1:
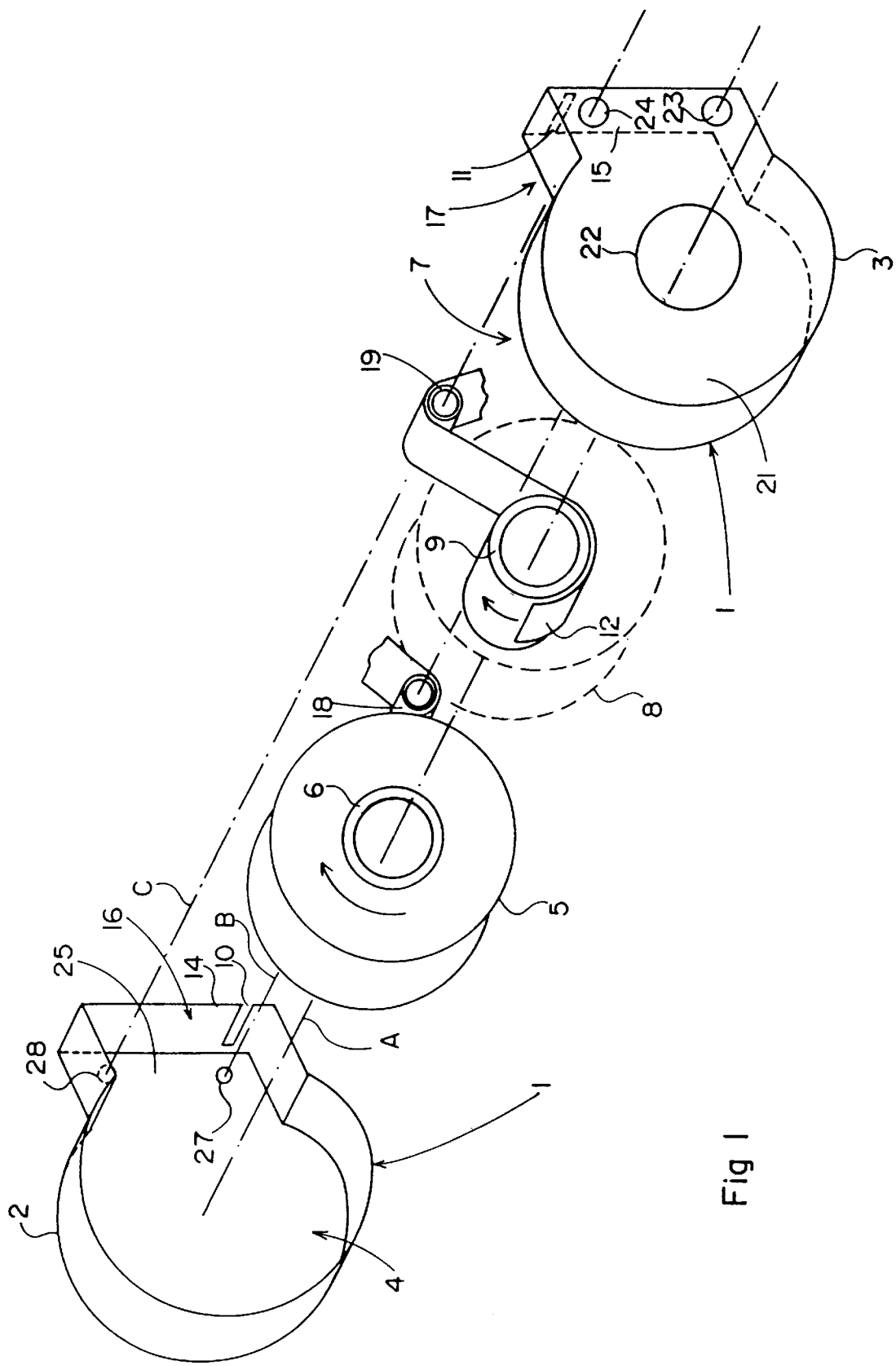
FIG. 1 is a general schematic in exploded perspective view of a first embodiment of a movie film cassette according to the invention.

A cassette according to the invention is formed by a casing 1 made of a light-tight material, for example opaque plastic. According to the embodiment shown in FIG. 1, casing 1 is, for example, formed of two shells 2 and 3 having complementary shapes adapted to mate at the free ends of the walls of the shells.

A first shell 2 defines a first main compartment 4 adapted to receive an unexposed film reel 5 rolled about a first core 6. Compartment 4 forms a compartment to receive a supply reel 5. A second shell 3 defines a second compartment 7 adapted to receive the film, after exposure, in the form of an exposed film collection reel 8, rolled about a second core 9. Cores 6 and 9 and thus reels 5 and 8 are coaxial (Axis A).

Figure 3:
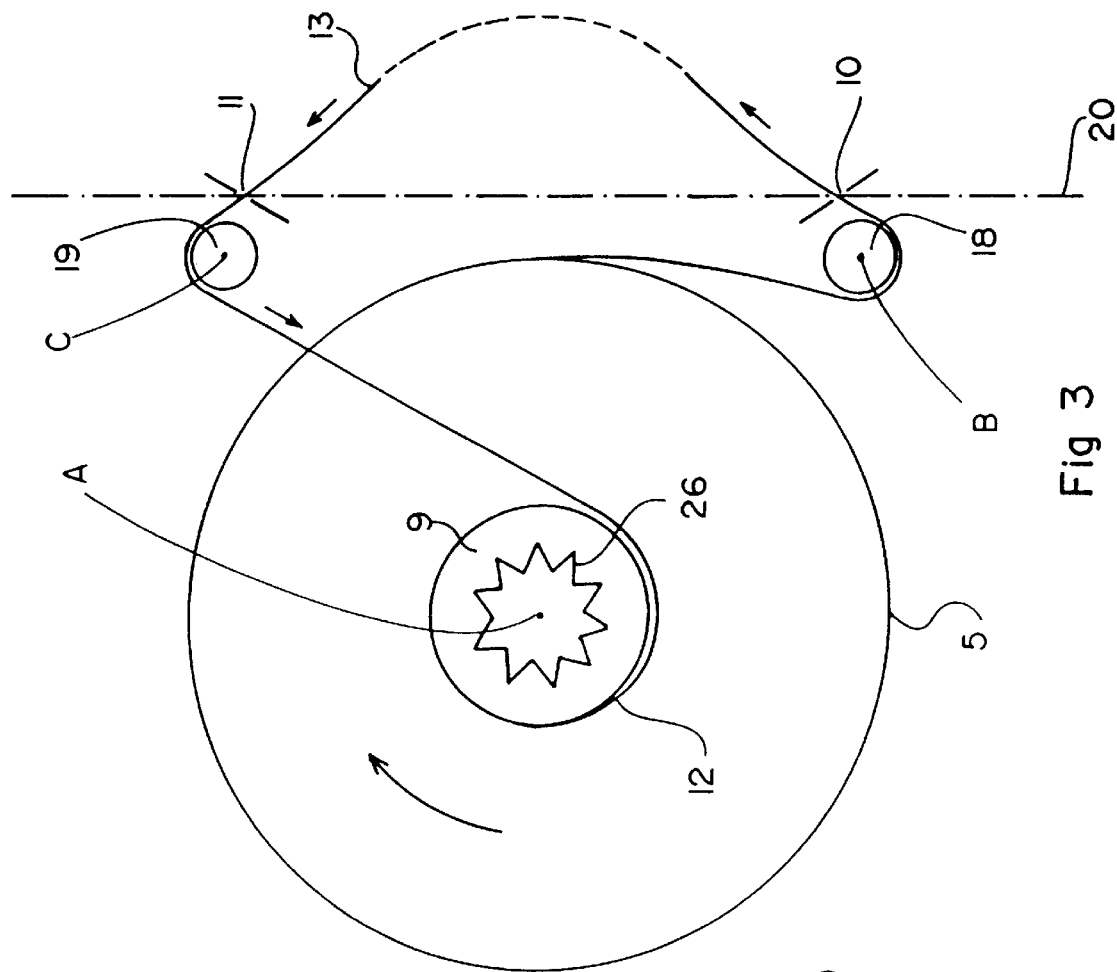
FIG. 3 illustrates the path of the film in a cassette such as shown in FIG. 1.
Figure 2:
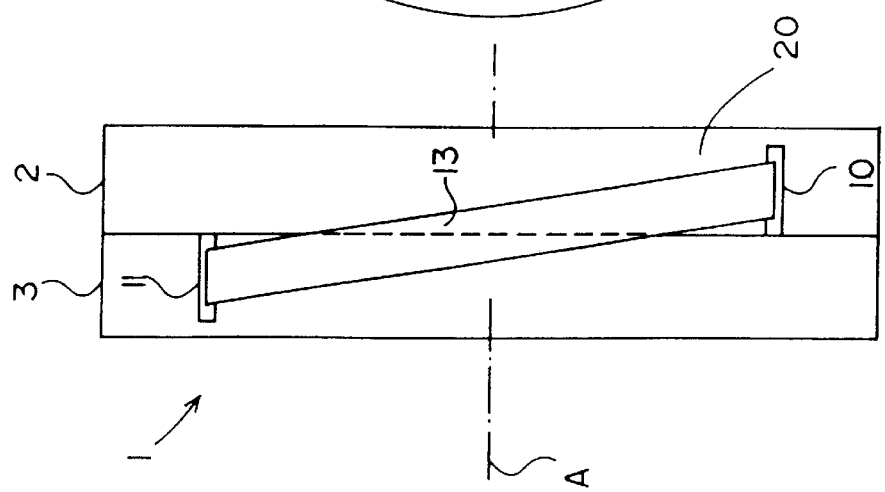
FIG. 2 is an elevation view, at the film output side of a cassette such as shown in FIG. 1.

Each of shells 2 and 3 includes, in one of its walls, a respective slot 10 and 11 for passage of the film between each of compartments 4 and 7 and the outside of casing 1. According to the invention, slots 10 and 11 define a path for the film between reels 5 and 8. A leader 12 of the unexposed film 5 is fixed, for example glued, to core 9 after coming out of compartment 4 through slot 10 and penetrating into compartment 7 through slot 11 (FIGS. 2 and 3).

It should be noticed that the film mounted in the cassette does not include, according to the invention, an available leader. In contrast, a portion 13 (FIGS. 2 and 3) of the film is present outside casing 1. Portion 13 is designed to follow a path determined by the rollers of a reception device (not shown) for the cassette associated with the camera, passing behind an objective included in the optic block of the camera. According to the invention, the mounting of the film in the reception device is in a loop.

Since reels 5 and 8 are coaxial and since slots 10 and 11 are each provided in a different respective shell 2 and 3, slots 10 and 11 will be shifted one with respect to the other in the axial direction A of reels 5 and 8. Preferably, and as shown in FIG. 2, the longitudinal direction of slots 10 and 11 is parallel to the axial direction A. The passage of the film in front of the shutter window associated with the back of the objective should however be parallel to the window. The straightening of this film portion 13 is achieved by the reception device, for example by a shifting roller or a back pressure pad provided with lateral stops to urge the film parallel to the shutter window.

Slot 10 or 11 is preferably located in a wall 14 or 15 of shell 2 or 3, respectively, outside the main compartment 4 or 7 that the shell defines.

Each shell 2 or 3 defines in addition, according to the invention, a secondary compartment 16 or 17, respectively. According to the first embodiment, each compartment 16 or 17 is adapted to receive, with radial and axial clearance, a roller 18 and 19, respectively, to return the film from each reel 5 or 8 toward the slot 10 or 11, respectively, associated therewith. In fact, as illustrated in FIG. 3, roller 18 ensures a return of the unexposed film from slot 10 and roller 19 ensures a return of the exposed film from slot 11 toward core 9 or reel 8. The axes B and C, respectively, of rollers 18 and 19 are parallel with axis A of cores 6 and 9.

According to the invention, the secondary compartments 16 and 17 form with rollers 18 and 19 light hindering deflectors between slots 10 and 11 and the main compartments to which they are respectively associated.

Preferably, slots 10 and 11 are included, after assembling the two shells 2 and 3, in a frontal plane (FIG. 2) for access to portion 13. Each of slots 10 and 11 is substantially proximate to one end of the frontal plane 20.

To facilitate the introduction of the unexposed film into casing 1, each slot 10 or 11 is preferably opened upon fabrication of the cassette at its end near the free side of the wall 14 or 15, respectively, in which the slot is formed.

Shell 3 includes, in its bottom 21, a first aperture 22 permitting the passage of a main shaft (not shown) of the reception device or of the optic block of the camera.

The main shaft of the reception device has, for example, a first portion which is motor driven and designed to receive the second core 9. A second portion of the main shaft may freely rotate, or be slightly braked, and is designed to receive the first core 6. Cores 6 and 9 include, as shown in FIG. 3, teeth 26 at their inner periphery to be rotation engaged by the portions of the main shaft to which they are connected. Teeth 26 of cores 6 and 9 are not represented in FIG. 1 and core 6 about which the unexposed film is wound is not represented in FIG. 3. The first portion of the main shaft includes an axial stop which is contacted by the lower edge of core 9 when the cassette is introduced in the reception device. As an alternative, the reception and supply reels may be swapped. The second portion of the main shaft may be motor driven and the first portion free to rotate.

Aperture 22 has a diameter slightly larger than the external diameter of the main shaft, thus than the inner diameter of cores 6 and 9, and slightly smaller than the external diameter of cores 6 and 9. Thus, core 9 can no longer escape from the assembled casing 1.

Since cores 6 and 9 are accommodated in casing 1 with axial and radial clearances, the main shaft imposes, by the abutment of its first portion, a clearance between core 9 and the bottom of casing 1 which is defined by bottom 21 of shell 3. In addition, the inner thickness of casing 1 is such that, when cores 6 and 9 are positioned on the main shaft, the supply reel 5 does not contact the inner surface of shell 2.

To lock reels 5 and 8 on the main shaft and prevent them from axially moving when the cassette is in operating position, the invention ensures an automatic locking of core 6 on the main shaft as soon as it is suitably engaged thereon. An embodiment of the lock means is described with relation to FIGS. 6A–6B.

According to the first embodiment shown in FIG. 1, bottom 21 further includes two secondary apertures 23 and 24 to permit the passage of secondary shafts (not shown) of the reception device. The secondary shafts are designed to be engaged into rollers 18 and 19 which, according to the invention, are hollow. The inner diameter of the rollers is, according to the invention, sized so that the rollers are engaged with a slight clearance on the secondary shafts which can freely rotate. The clearance is, for example, approximately two tenths of a millimeter. Like aperture 22, the diameter of apertures 23 and 24 is slightly larger than the diameter of the secondary shafts, and therefore larger than the inner diameter of rollers 18 and 19, and slightly smaller than the external diameter of rollers 18 and 19.

Rollers 18 and 19, associated with the secondary shafts, ensure suitable positioning of the film with respect to the rollers of the reception device. When the cassette is introduced into the reception device, the secondary shafts are engaged into hollow rollers 18 and 19. Rollers 18 and 19 are, according to the invention, cap-shaped so that their engagement on the secondary shafts is axially limited.

The radial positioning of the rollers on the secondary shafts is ensured by the film itself. Indeed, traction exerted by the film on rollers 18 and 19 prevents the rollers from contacting the walls of the secondary compartments 16 and 17 in which they are respectively accommodated. In addition, the traction ensures the rotation connection between rollers 18 and 19 and their respective secondary shafts despite the slight diameter difference between the inner surface of rollers 18 and 19 and the external surface of the secondary shafts. The secondary shafts may include annular rings (not shown), for example of rubber, to improve the rotation connection of the shafts with the rollers.

It should be noticed that the clearance with which rollers 18 and 19 are engaged in the secondary compartments 16 and 17 and the slight clearance with which rollers 18 and 19 are engaged on the secondary shafts compensates for the fabrication tolerances of rollers 18 and 19.

The axial positioning of rollers 18 and 19 on their respective secondary shafts is achieved, according to the invention, either by a cap of the reception device which covers at least partially the cassette, or by rollers 18 and 19 themselves.

According to a first embodiment of the means for axially positioning rollers 18 and 19, the bottom 25 of shell 2 includes two apertures 27 and 28 (FIG. 1) which are respectively coaxial with apertures 23 and 24. The role of apertures 27 and 28 is to permit the passage of pins (not shown) formed so as to protrude inwards from the cover to axially push rollers 18 and 19 towards their respective secondary shafts. The diameter of apertures 27 and 28 is slightly larger than the diameter of the pins of the cover to avoid contact between the pins and casing 1. Preferably, the pins are spring mounted to compensate for the fabrication tolerances of the cassette. Because of the presence of apertures 27 and 28 in shell 2, the upper surfaces of rollers 18 and 19 preferably include a peripheral annular groove (not shown). The groove is designed to cooperate with radial and axial clearance with ribs (not shown) protruding inwards from shell 2 and arranged near the periphery of apertures 27 and 28 to form traps for light coming from apertures 27 and 28.

According to the second embodiment (not shown) of the axial positioning means of the rollers 18 and 19, these rollers position themselves automatically by magnetization on the secondary shafts. An advantage of this second embodiment is that it avoids the presence of apertures 27 and 28 in shell 2 and thus the provision of traps for light coming from these apertures.

Since the two reels 5 and 8 are in different planes, the secondary shaft associated with roller 18 is longer than the secondary shaft associated with roller 19. Rollers 18 and 19 can also have different lengths. This is the case if, for example, as represented in FIG. 1, the inner thickness of casing 1 at axes B and C is the same as at axis A. Preferably, rollers 18 and 19 have the same length, which is determined as a function of the width of the film for which the cassette is designed. Shell 2 then includes means for limiting the axial displacements of roller 19 and shell 3 includes means for limiting the axial displacements of roller 18.

The cassette according to the invention is introduced by engaging, through apertures 22, 23 and 24, cores 6 and 9 and rollers 18 and 19 on the main and secondary shafts which protrude from the bottom of the reception device 34. The film loop 13 is then positioned to follow the path imposed by the guiding rollers of the film toward a back pressure pad. The cover of the reception device then isolates portion 13 from light as well as apertures 27 and 28 if provided in shell 2. According to the invention, the cassette includes means for cooperating with the bottom of the reception device to lock casing 1 in position and ensure light-tightness through apertures 22, 23 and 24.

A feature of the present invention is that all the elements of the cassette, which are designed to move when the film is driven, are accommodated with clearance in casing 1. In addition, none of these components contacts a fixed element of casing 1 when the film is unwound, i.e., when the cassette is in operating position. Since the film only contacts moving elements, this means that, when the film is moving, it does not contact any fixed element of casing 1 or contained in the casing.

Indeed it should be remarked that neither rollers 18 and 19, reels 5 and 8, nor cores 6 and 9 contact the walls of casing 1 when the cassette is used in the reception device. Of course, the film does not contact the walls of slots 10 and 11 which are adapted to the positions of the rollers of the reception device.

An advantage of the present invention is that reels 5 and 8 are permanently protected from light. The supply and collection in a cassette according to the invention can be done in full light without risk for the unexposed exposed film to be veiled. Only portion 13, which is used to place the film about the rollers of the reception device, is exposed to light.

A further advantage of the present invention is that the cassette does not generate noise during filming even though its constitutive elements can be fabricated with tolerances substantially larger than those of the driving mechanism and of the reception device. Indeed, the position of the moving elements included in the cassette is adjusted by the main and secondary shafts of the reception device. Since the moving elements do not contact casing 1 and since the film does not contact the walls of the casing, there is no friction liable to generate noise.

Casing 1, according to the invention, may be formed differently than by the two shells 2 and 3 represented in the drawings. For example, only a single shell can be provided, with a depth corresponding to the height (including clearance) of reels 5 and 8 and which is closed by a plate. Apertures 22, 23 and 24 are formed, either in the bottom of the single shell or in the closing plate as a function of the location of the collection reel 8.

FIGS. 4–7 show a second embodiment of a cassette according to the invention. As before, cassette 1' comprises two shells 2' and 3' defining, apart from two main compartments 4 and 7 designed to receive film reels 5 and 8, two secondary recesses 16' and 17' for organizing the passage of the film in a loop outside the cassette.

A feature of this second embodiment is that the secondary recesses 16' and 17' are designed to receive shutters, respectively 30 and 31, movable between an open or use position, and a closed or storage position. In the open position, shutters 30 and 31 uncover large openings, respectively 32 and 33, provided in front walls 14' and 15' of shells 2' and 3'. Openings 32 and 33 are sized such that the film may come out of the cassette towards a guiding roller of the reception device, without contacting walls of the cassette, whichever film length is wound in the corresponding reel. In the closed position, the shutters 30 and 31 define, with curved walls 43 and 44 of the secondary recesses 16' and 17', film slots 10' and 11' for communication with the outside of the cassette and assist the guidance of the film between reels 5 and 8 and these slots 10' and 11'.

Figure 4:
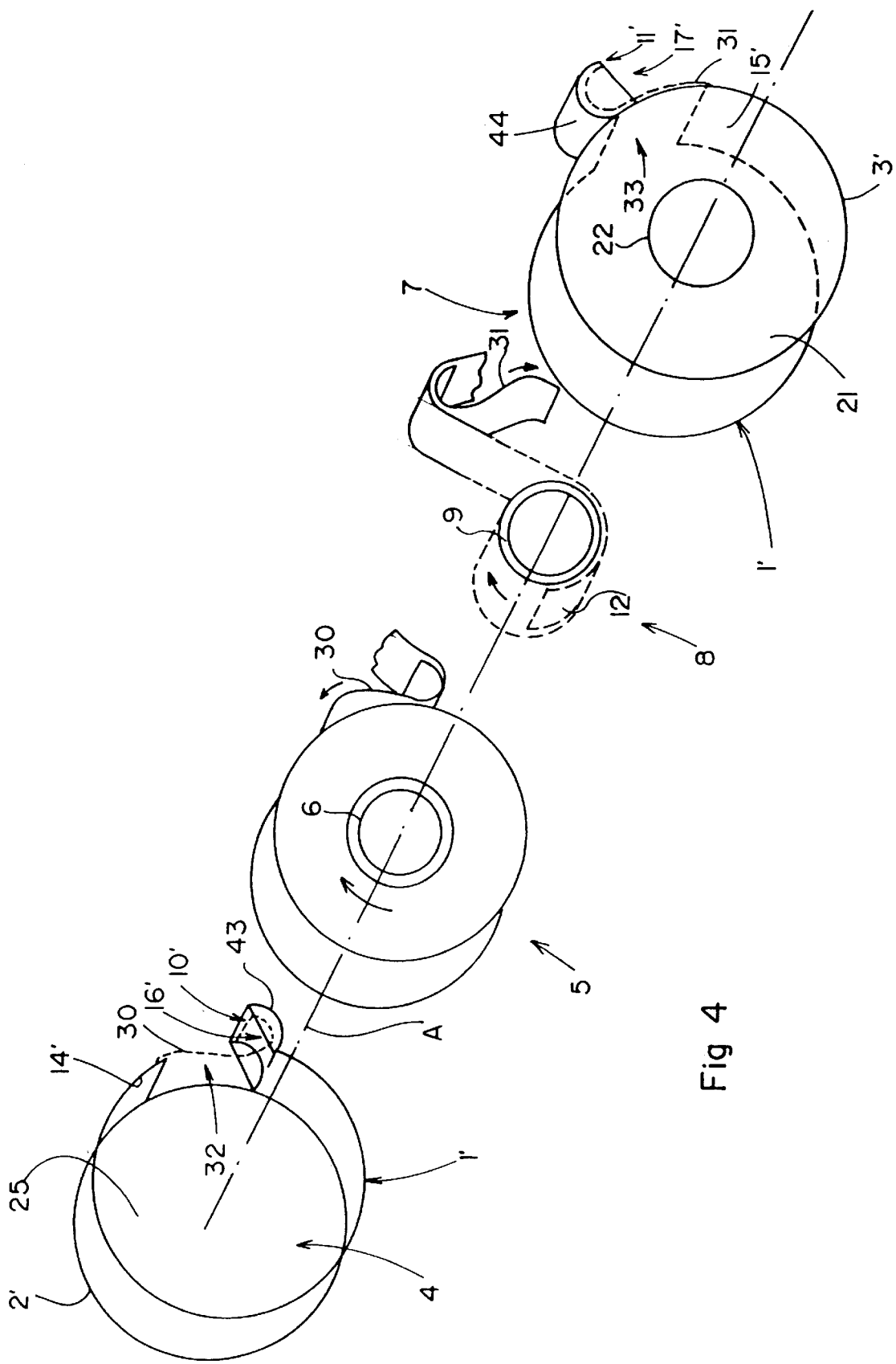
FIG. 4 is a general schematic in exploded perspective view of a second embodiment of a cassette according to the invention.

In the view of FIG. 4, shutters 30 and 31 are shown in closed position and their respective positions in shells 2' and 3' are shown in dotted lines.

Figure 5A:
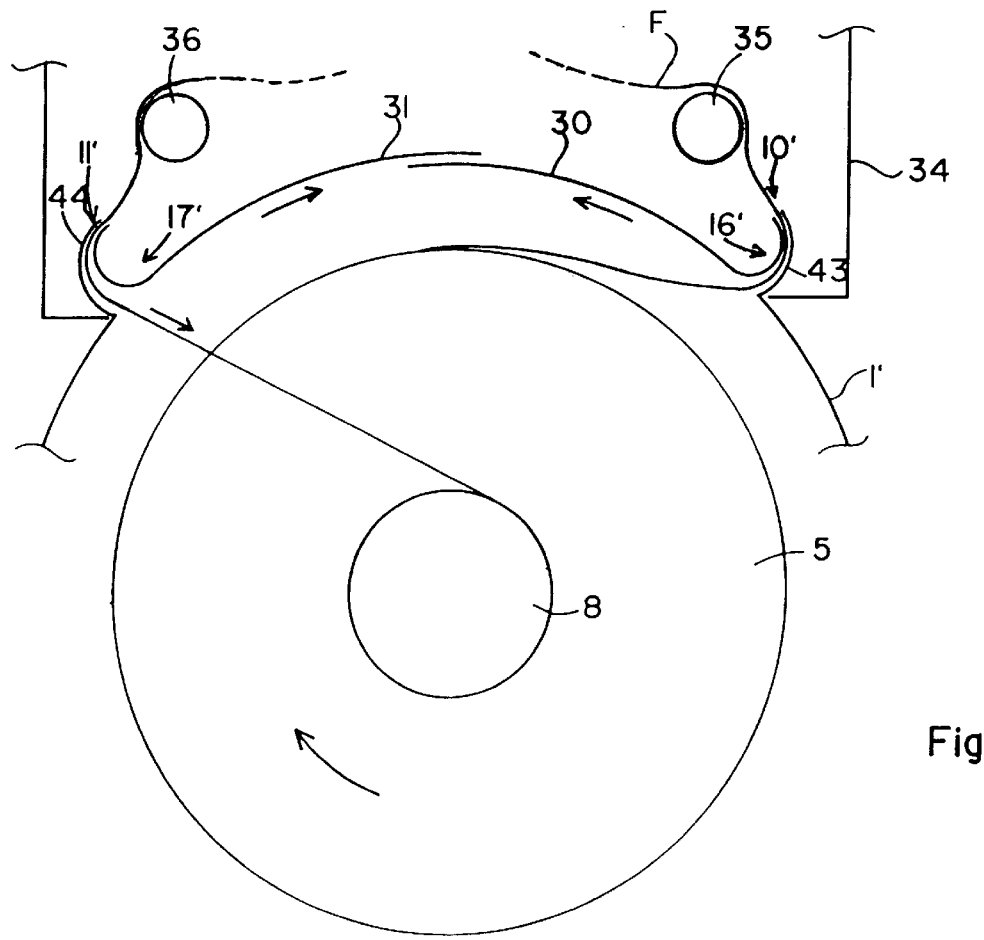
FIGS. 5A and 5B illustrate the path of a film in a cassette such as shown in FIG. 4, respectively, in a mounting position within a camera and in a use position.
Figure 5B:
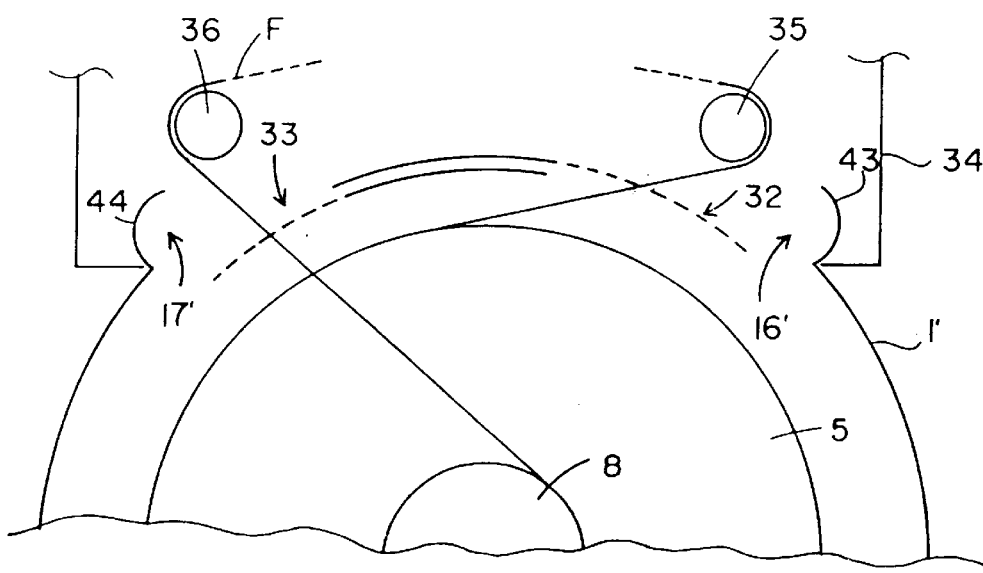

FIGS. 5A and 5B illustrate the path of the film in the closed and open position, respectively, of shutters 30 and 31. FIG. 5A shows the cassette while it is inserted in a reception device 34, i.e. when the user pulls the film loop up to the back pressure pad (not shown) of the camera. During this mounting of the film, the shutters are still closed and the film is passed outside the guiding rollers 35 and 36 which are part of the reception device 34.

Once the film F is placed and the reception device closed hermetically to light with a cover, the shutters are opened (FIG. 5B) and the film then directly passes from a reel to an associated roller 35 or 36, the shutters 30 and 31 having freed the openings 32 and 33. If necessary, the radial separation between rollers 30 and 31 and the reels may be reduced when the shutters are open. For this purpose, rollers 35 and 36 or the main shaft may be movable in the reception device.

The cassette or the reception device comprises means, accessible from outside, for controlling the opening and closing of the shutters. This is achieved, for example, through a gear system controlling the travel of the shutters in slide guides provided in shells 2' and 3'.

It will be noted that, although they have been shown one above the other to make their respective positions more apparent, the shutters 30 and 31 are in practice next to each other so that they do not disturb each other.

The curved shape of walls 43 and 44 of the secondary recesses participates in the definition of slots 10' and 11' with the shutters, whereas it also constitutes a light trap from the outside when the shutters are in closed position.

An advantage of the embodiment shown in FIGS. 4 and 5 is that the cassette is adapted both to a reception device whose main shaft is motor driven and to a reception device in which at least one guiding roller 35 or 36 is motor driven.

FIGS. 6 and 7 illustrate an embodiment of shells 2' and 3' constituting a casing 1' of the cassette according to the invention. FIGS. 6A and 7A are elevation views, respectively inner and outer, of the respective shells 2' and 3'. FIGS. 6B and 7B are cross-section views according to respective lines VI—VI and VII—VII of FIGS. 6A and 7A.

Shells 2' and 3' define, apart from compartments 4 and 7, secondary compartments, respectively 16' and 17'. For sake of clarity, reels 5 and 8, shutters 30 and 31 and core 6 are not shown in FIGS. 6 and 7. Compartment 16', defined by shell 2', constitutes, with shutter 30 in closed position, a light trap from slot 10' as well as a guiding means for the film from reel 5 towards the outside during the storage periods of the cassette. Similarly, the compartment 17', defined by shell 3', constitutes, with shutter 31 in closed position, a light trap from slot 11' as well as a means for guiding the film.

Shells 2' and 3' have similar general shapes so that they may be assembled the one to the other, for example by complementary free ends 46 and 47 of their respective walls, as shown in FIGS. 6B and 7B.

According to an embodiment shown in FIGS. 6 and 7, the recesses 16' and 17' are radially spaced apart from the circular compartments 4 and 7. A first axial end 39 of a compartment 16' or 17' is substantially coplanar to the bottom 25 (or 21) of shell 2' (or 3'). A second axial end 40 is defined by the other shell 3' (or 2') and is substantially coplanar with the free ends 46 or 47 of its walls.

Shells 2' and 3' also define guiding means for shutters 30 and 31. For example, slide guides 37 are provided in the internal surfaces of bottoms 21 and 25 and of protrusions 39, and slide guides 38 are provided in the respective peripheral sides 46 and 47 of shells 2' and 3' and in the external surface of protrusions 40. Thus, when the two shells are assembled, the slide guide 37 of shell 21 faces the slide guide 38 of shell 3' and guides shutter 30. Similarly, slide guide 37 of shell 3' faces slide guide 38 and guides shutter 31.

The bottoms 25 and 21 additionally have an internal circular rib 41, coaxial with axis A, of a slightly greater diameter than the external diameter of core 6 or 9. These ribs 41 define the radial clearance of reels 5 and 8 during the storage period. Preferably, the length of cores 6 and 9 is greater than the width of the film. As shown in FIG. 7B, the two ends of each core preferably have shoulders 58 and 59. Shoulders 58 are intended to cooperate with clearance defined by ribs 41. Shoulders 59 of cores 6 and 9 face each other and determine a separation between the two reels 5 and 8.

This separation allows, according to an embodiment, to separate the two compartments 4 and 7 by a central plate (not shown). This plate is fixed to the casing by being, for example, pinched between adapted bosses, provided in the internal surfaces of the walls of shells 2' and 3', proximate to their free ends. The plate comprises a hole at its center for avoiding contact with cores 6 and 9. Additionally, both the width of this plate and the height of shoulders 59 is chosen so that the plate does not touch reels 5 and 8 when the cassette is in use position. Preferably, the diameter of opening 22 is comprised between the diameter of shoulders 58 and the middle external diameter of cores 6 and 9.

According to another embodiment (not shown), each reel 5 and 8 comprises lateral flanges for axially maintaining the film it contains. These flanges are, preferably, in an opaque material for protecting the reels against light which is likely to penetrate through opening 22.

According to an embodiment of axial locking means of the cores on the main shaft of the reception device, a disk 42 (FIGS. 6A and 6B) is located between the bottom 25 and core 6, for example by being radially maintained by rib 41 of shell 2'. According to the invention, disk 42 is designed to cooperate by magnetization with the free end of the main shaft, for avoiding any axial displacement of reels 5 and 8 when the cassette is located in the reception device.

When the cassette is positioned in the reception device by engaging cores 6 and 9 onto the main shaft, cores 6 and 9, and thus reels 5 and 8, are automatically axially locked by disk 42. As soon as the space separating disk 42 from the free end of the main shaft is sufficiently small to permit magnetic attraction, disk 42 is urged onto the free end of the main shaft, thereby urging core 6 to suitably engage onto the second portion of the main shaft. In addition, disk 42 hinders axial displacement of reels 5 and 8 as long as the cassette is in operating position in the reception device.

Preferably, disk 42 is provided with means for positioning it radially on the main shaft. These radial positioning means are, for example, comprised of a tapered shoulder (not shown) directed towards opening 22. This shoulder may then cooperate like a cam with a complementary recess provided at the end of the main shaft. When disk 42 is magnetically attracted by the main shaft, it positions itself coaxially to the main shaft.

The use of such a disk 42 substantially simplifies the realization of the locking means of cores 6 and 9 on the main shaft. Indeed, the magnetic attraction does not need to be very high because, when the film is driven, the forces applied on the reels are dynamically radial. A magnet whose force is greater than the weight of reels 5 and 8 (including the film and cores 6 and 9) is thus sufficient to avoid loosing the axial holding when the cassette is in place in the reception device. Disk 42 is, for example, metallic if the free end of the main shaft is magnetized. Disk 42 itself may also be magnetized.

The back of shell 2' moreover has a protruding rib 45 constituting sealing means for the light between the cover of the reception device and casing 1'. Indeed, when the cassette is in use position, portion 13 (FIG. 3), which travels in the driving mechanism must not be exposed to other light than that from the optical block. The invention thus provides a link which is light-tight between casing 1' and the reception device. Rib 45 is, for example, intended to flatten a sealing means provided on an internal surface of the cover of the reception device. The path of rib 45 depends on the constitution of the cover and of the cassette according to the invention for defining a suitable light-tight region.

Bottom 21 also has an external rib 51 adapted to cooperate with a light-tight sealing means provided in the reception device. The path of rib 51 depends on the constitution of the reception device and of the cassette according to the invention. Here, this rib 51 defines, with the light-tight sealing means of the reception device, a light-tight region which includes opening 22.

In an exemplary embodiment of means for locking the cassette on the reception device, grooves 50 are formed so as to protrude from bottom 25. Grooves 50 are designed to cooperate, by complementary shapes, with a locking part (not shown) associated with the reception device to maintain casing 1'. Grooves 50 are, for example, designed to cooperate, by complementary shapes, with a locking part that is screwed, for example, by one quarter turn. Grooves 50 are shown associated to shell 2'. As an alternative, they may be associated to shell 3'. Preferably, the locking part includes means for facilitating extraction of the cassette from the reception device. Such means can, for example, be formed by one or more cams (not shown) provided outside grooves 50 and/or on the locking part to urge the casing, while rotating the locking part, to a position where the cassette is released. This facilitates, in particular, the separation of disk 42 from the magnet of the main shaft. In addition, this permits to separate the cassette from the main and secondary shafts in a safe way for the shafts and the cassette.

The locking means of the cassette can also be formed, for example by magnetization, by placing in the cassette, or in casing 1', a metal element designed to cooperate with a magnet of the reception device.

An advantage of the present invention is that casing 1 or 1' may be easily obtained by injection of plastics. Rollers 18 and 19 (or shutters 30 and 31), the reel 5 rolled about core 6, the collection core 9 and disk 42 are positioned in casing 1 before assembly of the two shells 2 and 3 (or 2' and 3') which form casing 1. Loop 13 is also formed before closing the casing by coupling leader 12 to core 9.

A further advantage of the present invention is that, since the cassette no longer includes very accurate mechanical elements, the cassette can be expendable (discardable). Since both the unexposed film reel 5 and the exposed film 8 are protected by casing 1 or 1', a cassette according to the invention can be used to store films before exposure and before development. Thus the use of conventional storing boxes is avoided.

If necessary, the casing may be provided with an external recess for receiving a removable data card containing information on the film contained in the cassette.

As is apparent to those skilled in the art, various modifications can be made to be above-described preferred embodiments. In particular, the size of the elements predominantly depends upon the width of the film for which the cassette is designed.

I claim:

1. A movie film cassette comprising a light-tight casing formed by fixed elements and including moving elements, containing an unexposed film reel and adapted to contain, after shooting, an exposed film reel; and means for positioning said reels and the film so that, in an operating position within a reception device associated with a movie camera, no moving element, located in the casing and contacting the film, is in contact with a fixed element of the casing, the film itself, not being in contact with a fixed element of the casing.

2. The cassette of claim 1, wherein said means for positioning said reels include means for cooperating with a main shaft of the reception device adapted to penetrate into said casing through a main aperture, for axially positioning and maintaining, about the main shaft, coaxial cores about which the reels are rolled.

3. The cassette of claim 2, wherein said maintaining means are formed by a disk accommodated, with a determined clearance, in an inner surface of a wall of the casing opposite to a wall in which the main aperture is formed, the disk being adapted to cooperate through magnetization with a free end of the main shaft.

4. The cassette of claim 3, wherein the casing includes means for limiting, with a determined clearance and when the cassette is in a storage position outside the reception device, the axial and radial displacements of the cores.

5. The cassette of claim 4, wherein the means for limiting the displacements of the cores with clearance are formed, for axial displacements, by the thickness of the main compartments defined by the casing for the reels.

6. The cassette of claim 5, wherein the cores are longer than the width of the film for which they are designed and include, near each of their ends, a shoulder forming means for limiting, with a determined clearance, the axial and radial displacements of the cores.

7. The cassette of claims 6, comprising two shutters adapted to close openings for the passage of the film when the cassette is in a use position.

8. The cassette of claim 7, wherein the casing defines two secondary recesses for receiving one end of the shutters in the closed position for defining, with holes of the secondary recesses, narrow slots for communication between the inside and the outside of the cassette.

9. The cassette of claim 8, wherein the shutters constitute, in the closed position, guiding means for the film between said reels and the slots.

10. The cassette of claim 9, wherein the openings are sized such that, when the shutters are open, the film is not in contact with a wall of the casing, whichever the diameter of the reels.

11. The cassette of claim 8, wherein the casing is formed by a first shell constituting a first main compartment for said unexposed film reel, a second shell constituting a second main compartment for said exposed film reel, each of said slots being formed in one of the shells along a longitudinal direction parallel to the axial direction of the reels.

12. The cassette of claim 11, including light-tight means adapted to cooperate with corresponding means included in the reception device to protect from light at least one portion of the film external to the casing.

13. The cassette of claim 6, wherein said means for positioning said film include a hollow roller associated with each reel, each roller being designed to guide the film from the reel associated therewith toward a slot communicating with the outside of the casing and adapted to be engaged, with radial clearance, in a secondary shaft provided in said reception device.

14. The cassette of claim 1, wherein said means for positioning said film include a hollow roller associated with each reel, each roller being designed to guide the film from the reel associated therewith toward a slot communicating with the outside of the casing and adapted to be engaged, with radial clearance, in a secondary shaft provided in said reception device.

15. The cassette of claim 14, wherein the casing is formed by a first shell constituting a first main compartment for said unexposed film reel, a second shell constituting a second main compartment for said exposed film reel, each of said slots being formed in one of the shells along a longitudinal direction parallel to the axial direction of the reels.

16. The cassette of claim 1, including light-tight means adapted to cooperate with corresponding means included in the reception device to protect from light at least one portion of the film external to the casing.

17. A movie film cassette, comprising:
   a light-tight casing for housing an unexposed film on a supply reel and an exposed film on a receiving reel, said casing including at least one aperture for positioning said reels when engaged with a reception device associated with a movie camera wherein said reels are prevented from contacting said casing, said casing further including a first and a second film aperture through which said film passes for communicating with said reception device; and
   means for guiding said film between said reels through said first and second film aperture of said casing, said means for guiding associated with each of said reels wherein said film and said means for guiding said film are prevented from contacting said casing.

18. The cassette of claim 17, wherein said means for guiding include a plurality of rollers.

19. The cassette of claim 18, wherein said rollers are hollow for receiving a shaft from a reception device associated with a movie camera.

20. The cassette of claim 19, wherein said casing further includes at least two slots, wherein said film is passed from one slot to the other by said plurality of rollers without contacting said at least two slots.

* * * * *